United States Patent [19]

Winitz

[11] 3,877,873
[45] Apr. 15, 1975

[54] TEST FOR METABOLIC CONDITIONS IN BLOOD OR SERUM

[76] Inventor: Milton Winitz, Rt. 9, Box 12A, Milton, Fla. 32570

[22] Filed: June 26, 1972

[21] Appl. No.: 266,087

[52] U.S. Cl............................................. 23/230 B
[51] Int. Cl. ........................................ G01n 33/16
[58] Field of Search .................... 23/230 B; 252/408

[56] References Cited
UNITED STATES PATENTS
3,492,095  1/1970  Tillem .............................. 23/230 B
3,607,695  9/1971  Schneider...................... 23/230 B X Primary Examiner—Joseph Scovronek
Assistant Examiner—Arnold Turk

[57] ABSTRACT

Simple inexpensive testing procedures are provided for detecting the existence of a large number of different diseased metabolic states whereby whole blood or blood serum is added to reagent solutions and the resulting color development or opacity compared to known standards. Depending upon the diseased state, gentian violet (methylrosaniline chloride) or methyl red (p-dimethylaminoazobenzene-o-carboxylic acid) is employed as a colorant in at least one reagent solution in dilute saline water. Usually, there is one other reagent solution of distilled water (substantially free of salt). For determining certain diseased states, such as leukemia, Hodgkin's disease, sickle cell anemia or the trait, and alkalosis, heparin is also included in at least one reagent solution. For respiratory acidosis, metabolic acidosis, hypoglycemia and hyperglycemia, heparin is not employed and only distilled and saline solution with gentian violet are employed as the reagents.

8 Claims, No Drawings

TEST FOR METABOLIC CONDITIONS IN BLOOD OR SERUM

BACKGROUND OF THE INVENTION

Field of the Invention with many diseases, fatilities could be reduced by early recognition of the diseased state. However, the high cost of testing in many instances has precluded free or inexpensive screening of large groups of people as a prophylactic measure. Furthermore, because of expense, a screen for these diseases is not routine, unless there is some extrinsic symptom which suggests the possibility of such a disease. Therefore, it is extremely desirable that there be available a simple, quick and accurate method employing inexpensive reagents for determining diseased states. One group of diseased states of particular concern are the metabolic disease states, such as the various forms of leukemia, lymphosarcoma, Hodgkin's disease, sickle cell anemia, metabolic and respiratory acidosis and alkalosis, hypoglycemia and hyperglycemia.

SUMMARY OF THE INVENTION

Blood or blood serum is tested with at least one dilute solution of a colorant in dilute saline solution to produce a color, frequently in combination with a dilute solution of the colorant in distilled water. Depending upon the disease being determined, successive dilutions are employed, normally in conjunction with heparin as an additional reagent. The colors or opacity which result, may be compared to standards to determine the presence of a number of diseased metabolic states.

DESCRIPTION OF THE SPECIFIC EMBODIMENTS

The testing procedure is based on the development of color or opacity in at least one reagent solution of a colorant comprising dilute saline water, frequently in combination with a distilled water reagent solution. The saline water will normally be equal to or less than one normal in salt, although other concentrations may be used and standards developed in relationship to the particular normality. Usually the saline concentration will be between 01. N to 1 N.

The colors produced in the water and saline solutions by the addition of blood or blood serum may be in conjunction with or independent of the presence of a colorant. The amount of colorant in any one solution is quite small, since only a few drops of a 0.1–0.5% solution is used for developing the colors, and even this amount becomes successively diluted, where aliquots are transferred.

For a number of diseases, a series of successive dilutions are employed, whereby the same or different colors or opacity results, depending on the existence of a particular diseased state. While the particular dilutions may be varied, conveniently, a one-to-two fold dilution will usually be employed. In most instances, heparin will be employed in conjunction with gentian violet to obtain the color or opacity developed. A different regimen is employed for different diseases or different groups of diseased states. By having a plurality of reagent solutions, greater accuracy is achieved in the results.

The first procedure to be considered is the testing for the leukemias: granulocytic, lymphocytic, monocytic and primitive white cell, as well as lymphosarcoma.

The reagents employed for this procedure are distilled water, one normal saline solution, 0.2 weight percent gentian violet in a 1:1 mixture of water:one normal saline solution; and heparin solution (100 units per ml). In preparing the blood sample, a freshly drawn blood sample is centifuged and the serum separated and refrigerated, if not used immediately. No anticoagulant should be employed and the serum should not be frozen prior to its use. The serum should normally be used not later than three days after the drawing of the blood sample.

To carry out the test procedure, seven tubes are employed. Tube 1 contains 4 ml one normal saline solution; tube 2 contains 4 ml distilled water; tube 3 contains 4 ml heparin solution; and tubes 4–7 contain 4 ml of the one normal saline solution. To tubes 1 and 2 is added two drops of the gentian violet reagent solution. This is followed by the addition of 2 ml of blood serum to both tubes 1 and 2, and the tubes are shaken. A 2 ml aliquot from tube 2 is transferred to tube 3 and the tube shaken. The aliquot transfer process is then repeated successively from tubes 3 to 4 and so on. In some instances, there will be required a waiting period until the color develops. Usually this will not exceed 30 minutes, the reading should not be taken until the color or opacity has been stable for a reasonable period of time, usually not exceeding 10 minutes.

The following table indicates the colors which are observable, depending upon the particular diseased state.

TABLE I

COLOR REACTIONS SHOWN BY THE VARIOUS LEUKEMIC BLOOD SERA
COLOR REACTIONS

| TYPE OF LEUKEMIA | TUBE NO. 1 | TUBE No. 2 | TUBE No. 3 | TUBE No. 4 | TUBE No. 5 | TUBE No. 6 | TUBE No. 7 |
|---|---|---|---|---|---|---|---|
| Granulocytic | pale pink | milky white | milky pink | pale pink | pale creamy brown | pale creamy brown | pale creamy brown |
| Lymphocytic | lavender | deep purple | murky deep purple | milky lavender | grey lavender | mauve | pale pink |
| Monocytic | deep rose[a] | deep rose[b] | lighter rose | lighter rose | lighter rose | lighter rose | electric pink |
| Primitive white cell | light brown[c] | milky off-white | cream (tinge) | — | — | — | — |
| Lymphosarcoma | lavender | deep purple | murky deep purple | milky lavender | grey lavender | mauve | pale pink |
| Normal | pink | purple | orange | — | — | — | — |

[a] Initial yellow-rose color goes to deep rose in 15 minutes.
[b] Initial blue-violet tint goes to deep rose in 17 minutes (same color and intensity as in tube No. 1).
[c] Whiskey color (mucky and dirty due to white cells).

It is noteworthy, that for the different types of leukemia, the first three tubes provide distinctively different colors, so that tubes 4–7 merely provide further verification of the conclusions which may be drawn from tubes 1–3.

For Hodgkin's disease, the same reagents are employed as were employed for the detection of leukemia. Seven tubes are employed as previously. In the first tube is introduced 4 ml of distilled water to which 2 ml of whole blood is added. In the second tube is present 2 ml of one normal saline containing heparin (100 units per ml) to which a 2 ml aliquot from tube 1 is added. In the third tube is 2 ml of distilled water containing two drops of gentian violet and a 2 ml aliquot from tube 2 is added. In each of the remaining tubes is 2 ml of 1 normal saline to which a 2 ml aliquot from the previous tube is added, so as to provide one fold dilution. the colors of tubes 3–7 are as follows: Tube 3—purple rust color; Tube 4—a lighter milky shade of the prior color; Tube 5—a brownish color; Tube 6—a pinkish milky brown color; and Tube 7—a lighter shade of the prior color. A negative result gives pink, purple and orange in the first three tubes.

For determining the presence of sickle cell anemia or the trait, a four tube test is employed. Whole blood (unheparinized) is used. In the first tube is 4 ml of distilled water to which is added 2 ml of whole blood. In the second tube is 4 ml of one normal saline to which is added a 2 ml aliquot from the first tube. In the third tube is 4 ml of one normal saline containing two drops of gentian violet reagent to which is added a 2 ml aliquot from tube 2. In the fourth and final tube is present 4 ml of saline containing one drop of gentian violet reagent and 200 units of heparin to which is added a 2 ml aliquot from the third tube. The first tube will have the regular blood color while the second, third and fourth tubes will be respectively: shocking pink color; deep purple color; and electric orange. For the sickle cell trait, the second, third and fourth tubes are pink, blue and pea green in color.

The next test procedure is for respiratory acidosis, metabolic acidosis, hypoglycemia and hyperglycemia. Only two tubes are employed, the first tube containing 4 ml of one normal saline solution and the second tube 4 ml of distilled water to each of which is added two drops of gentian violet reagent. To the two tubes is then added 2 ml of blood serum. The following table indicates the results.

TABLE II

| CONDITION | COLOR IN N SALINE | COLOR IN WATER |
|---|---|---|
| 1. Respiratory acidosis | lt. lavender (turbid) | lt. lavender (clear) |
| 2. Metabolic acidosis | lt. lavender (clear) | lt. lavender (clear) |
| 3. Hypoglycemia | lt. yellow (clear) | lt. lavender (clear) |
| 4. Hyperglycemia | lt. yellow (clear) | discoloration* (clear) |

*If hyperglycemia is extreme, color in water turns a strong, mucky yellow.

The final test procedure is for metabolic and respiratory alkalosis. The colorant employed is methyl red in place of gentian violet as a 0.2% solution in a 1:1 distilled water:N salin solution. The procedure for testing for leukemia is employed, but only the first three tubes are required. The third tube serves as a check, a positive response is determined by the color of the first two tubes. For metabolic alkalosis, the first tube is pink and the second tube green. For respiratory alkalosis, the first tube is yellow and the second tube golden rod yellow. For the normal patient, the three tubes should be pink.

The results of the above test procedures have been compared with the results obtained with established diagnostic tests for the various diseased states and there had been found to be an excellent correlation.

It is evident that the subject invention provides a simple, inexpensive and reliable method for determining a large number of different diseases. By employing gentian violet or methyl red as the colorants, and using comparisons of saline solution and/or distilled water reagents, in some instances in conjunction with heparin, a quick screening can be carried out. By virtue of this screening, testing for these diseases can become commonplace and public health programs instituted as a prophylactic measure.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A colorimetric method for determining the metabolic disease states: granulocytic leukemia, lymphocytic leukemia, monocytic leukemia, primitive white cell leukemia, lymphosarcoma, Hodgkin's disease, sickle cell anemia or trait, respiratory acidosis, metabolic acidosis, hypoglycemia and hyperglycemia, which comprises forming at least one dilute solution of whole blood or blood serum in dilute saline in the presence of gentian violet, and comparing the color produced to a standard.

2. A method according to claim 1 for determining Hodgkin's disease which comprises diluting whole blood into distilled water; introducing an aliquot of the diluted whole blood into a dilute solution containing heparin; transferring an aliquot of said heparin solution into a dilute solution of gentian violet reagent in distilled water; transferring an aliquot from said gentian violet solution to a dilute saline solution and repeating the transfers to successive saline solutions; and comparing the development of color to known standards.

3. A method according to claim 1 for determining sickle cell anemia or trait which comprises diluting whole blood in distilled water; transferring an aliquot of said diluted whole blood solution to saline solution; transferring an aliquot of said saline solution to saline solution containing gentian violet reagent; and transferring an aliquot of said gentian violet saline solution to a saline solution containing gentian violet and heparin; and comparing the resulting colors to known standards.

4. A method according to claim 1 for determining acidosis or glycemia which comprises introducing into a first tube containing dilute saline solution and gentian violet reagent and a second tube containing distilled water and dilute gentian violet reagent blood serum; and comparing the resulting colors to known standards.

5. A method according to claim 1 wherein a small amount of heparin is included in said solution.

6. A method according to claim 1 for determining different types of leukemia which comprises introducing into a first solution of saline containing gentian violet reagent, a small amount of blood serum; introducing into a second solution of distilled water containing gentian violet reagent a small amount of blood serum; transferring an aliquot from said distilled water solution to a third solution of dilute heparin solution of dilute saline; and comparing the colors produced to known standards.

7. A method according to claim 6, which includes having at least one additional saline solution and transferring an aliquot from said third solution to a fourth solution of saline, and from said fourth and succeeding solution of saline, transferring an aliquot from a solution which has previously received an aliquot to the next succeeding solution of saline.

8. A method for determining alkalosis which comprises introducing into a first solution of saline containing methyl red reagent, a small amount of blood serum; introducing into a second solution of distilled water containing methyl red reagent a small amount of blood serum; transferring an aliquot from said distilled water solution to a third solution of dilute heparin solution of dilute saline; and comparing the colors produced to known standards.

* * * * *